(12) United States Patent
Kirby

(10) Patent No.: US 7,141,292 B1
(45) Date of Patent: Nov. 28, 2006

(54) LAMINAR MATS AND A METHOD OF PRODUCTION THEREOF

(75) Inventor: John Kenneth Kirby, Lichfield (GB)

(73) Assignee: Innavisions, Limited (GB)

( * ) Notice: Subject to any disclaimer, the term of this patent is extended or adjusted under 35 U.S.C. 154(b) by 0 days.

(21) Appl. No.: 10/030,962

(22) PCT Filed: Jul. 7, 2000

(86) PCT No.: PCT/GB00/02625

§ 371 (c)(1),
(2), (4) Date: Jan. 9, 2002

(87) PCT Pub. No.: WO01/03918

PCT Pub. Date: Jan. 18, 2001

(30) Foreign Application Priority Data

Jul. 9, 1999 (GB) .................. 9916045.9

(51) Int. Cl.
*B32B 3/10* (2006.01)
*B32B 3/02* (2006.01)
*B32B 7/02* (2006.01)
*C09K 3/14* (2006.01)

(52) U.S. Cl. .................. 428/131; 428/46; 428/67; 428/68; 428/70; 428/142; 428/212; 428/219; 428/220; 428/446; 106/36; D14/458

(58) Field of Classification Search ........ 428/131, 428/172, 46, 67, 68, 70, 142, 212, 219, 220, 428/446; D14/458; 106/36
See application file for complete search history.

(56) References Cited

U.S. PATENT DOCUMENTS

| | | | | |
|---|---|---|---|---|
| 3,373,068 A | * | 3/1968 | Grosheim et al. ......... 156/219 |
| 3,940,528 A | * | 2/1976 | Roberts ..................... 428/161 |
| 3,995,984 A | * | 12/1976 | Fetherston et al. ........ 425/521 |
| 4,065,150 A | * | 12/1977 | Van Auken ................ 280/610 |
| 4,093,766 A | * | 6/1978 | Scher et al. ............... 428/165 |
| 4,339,489 A | * | 7/1982 | Barker et al. ............. 428/167 |
| 4,376,812 A | * | 3/1983 | West ......................... 428/165 |
| 4,748,072 A | * | 5/1988 | Schobermayr ............. 428/212 |
| 4,834,502 A | * | 5/1989 | Bristol et al. ............. 359/893 |
| 5,508,084 A | * | 4/1996 | Reeves et al. ............ 428/172 |
| 5,578,370 A | * | 11/1996 | Ferrar et al. .............. 442/186 |
| 5,834,104 A | * | 11/1998 | Cordani .................... 428/218 |
| 5,997,995 A | * | 12/1999 | Scianna .................. 428/195.1 |
| 6,132,844 A | * | 10/2000 | Altshuler et al. .......... 428/143 |

FOREIGN PATENT DOCUMENTS

| | | | |
|---|---|---|---|
| DE | 25 10 863 A | | 3/1975 |
| EP | 0 495 292 A1 | | 7/1992 |
| EP | 0 864 417 A2 | | 9/1998 |
| GB | 2289520 A | * | 11/1995 |
| WO | WO-A-97/26814 A2 | | 7/1997 |

OTHER PUBLICATIONS

DERWENT WPI; Japanese Patent 62 167048 A (Showa Denko KK); Abstract dated Jul. 23, 1987.
DERWENT WPI: Japanese Patent 02 025312 A (Wada Kogyo KK); Abstract dated Jan. 26, 1990.

* cited by examiner

*Primary Examiner*—Harold Pyon
*Assistant Examiner*—Patricia L Nordmeyer
(74) *Attorney, Agent, or Firm*—Kilpatrick Stockton LLP

(57) ABSTRACT

A laminar mat comprises a rigid planar tile of moulded plastics material having on respective faces a planar layer integrated therewith during moulding of the tile, the planar layers each being of similar material. Non-adhesive integration of the planar layers during moulding eliminates the need for adhesive. The mat may be moulded so as to include one or more projections, recesses and living hinges.

14 Claims, 6 Drawing Sheets

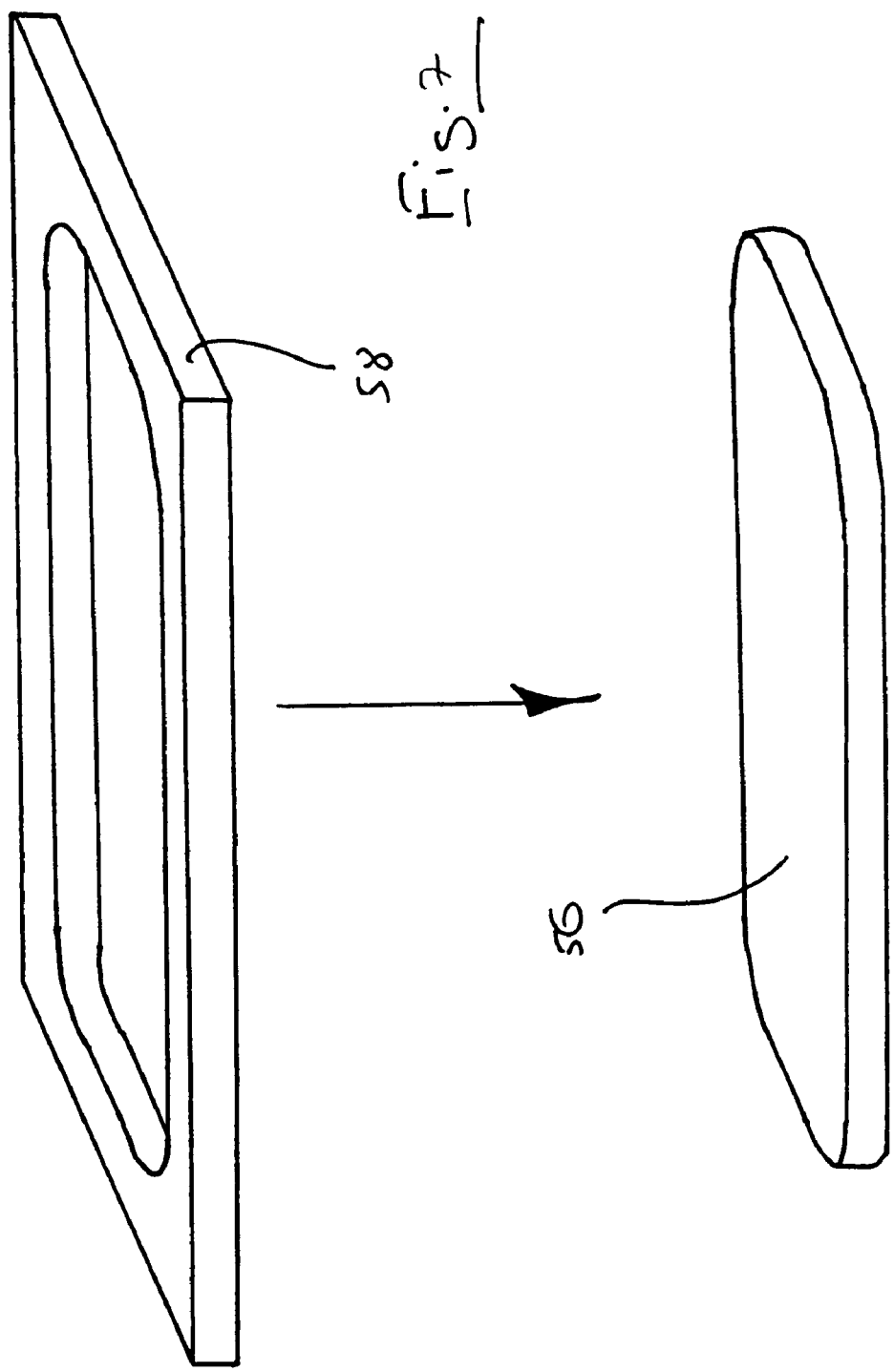

LAMINAR MATS AND A METHOD OF PRODUCTION THEREOF

The invention relates to laminar mats and a method of production thereof. The invention is especially applicable, but not limited to, mats for computer accessories such as a computer mouse. The mats may also be used as table mats or other types of mat for supporting objects on surfaces so as to protect the surfaces.

Mats of the laminar kind are known which are manufactured from a transparent or translucent hard layer of a plastics material, such as PVC of approximately 200 to 400 µm, and an underlying printed layer. The hard layer is usually bonded to a base of foam or other suitable material which provides a non-slip engagement between the mat and a surface on which the mat is supported for use. The hard layer confers a degree of rigidity to the mat and protects against damage to the surface of the mat by, for example, scuffs or dents. The relatively thick hard layer can, however, diffract light from the printed image and reduce the brightness of the print underneath. This, of course, reduces the effect of advertising on the mat.

An alternative form of mat includes a thinner upper layer (12 to 70 µm) of scuff-resistant, transparent plastic such as polypropylene (PP) bonded to an underlayer of (e.g. 200 gsm) printed paper. The combined layer is then bonded to a foam backing. The thinner transparent layer reduces the diffractive effect, but reduces the rigidity of the mat, causing it to have a cheaper feel and be more susceptible to damage. The mat therefore has a relatively short useful life before it needs to be replaced.

During manufacture of conventional mats, the laminated upper layer is fixed by adhesive to a lower backing layer of foam material, and the mat is cut to shape. The cutting of the laminated upper layer leaves a sharp rough edge on the upper perimeter of the mat. This edge can be uncomfortable for the hands and wrists of those using the mouse mat.

There is a need in the art therefore for a mat of sufficient rigidity to withstand wear and tear and protect any underlying decorative, advertising or other print, but allow underlying printed matter to be clearly visible. Furthermore, a mat of relatively slimline design to reduce costs and a mat provided with a smooth, more rounded edge portion is desirable. There is a further need for a mat which can be manufactured cheaply and quickly and which allows efficient attachment of foam or other non-slip backing material to the mat.

According to the first aspect of the invention there is provided a laminar mat comprising a rigid planar tile of moulded plastics material having on respective faces a planar layer integrated therewith during moulding of the tile, the planar layers each being of similar material.

The term rigid is used to describe the moulded tile as structurally self supporting. That is to say that the mat, when gripped at an edge and held horizontal, will maintain its shape and not sag under its own weight. Advertising logos or other printed matter may be printed on one or both of the planar layers.

Preferably, the planar layers are of a plastics material, such as polypropylene (PP) or oriented polypropylene (OPP). Additionally, or alternatively, the layers may be of paper or card.

The planar layers may be of laminar construction. The layers may include a layer of polyester.

The planar layers are of similar material so as to prevent distortion of the tile during moulding thereof, by reinforcing the upper and lower surfaces of the tile by an equivalent amount. The arrangement also allows the tile to be moulded of low cost plastics material which may otherwise distort when removed from the mould.

The mat may be provided with a projection extending from a face thereof. Such a projection is preferably formed during moulding of the tile via appropriate configuration of the mould. The projection may be provided on an upper surface thereof with one or more recesses. Such recesses may be used to locate components to the mat. The projection may be hollow so as to provide a recess in the opposing face of the mat. In such an embodiment the projection may be provided with a through hole to the recess on the other side thereof. The mat may be provided with a plurality of such projection/recess combinations.

The mat may be moulded so as to have one or more living hinges therein. In such an embodiment the mat may comprise a plurality of panels interconnected by living hinges. A mat thus formed may be folded into a three dimensional structure, for example a cube. Preferably the panels are provided with latch means so as to enable the mat to maintain the structure. The latch means may comprise interengageable projections and recesses of the panels formed during moulding of the mat.

Where the mat is a mat for a computer mouse, one or both of the layers may be covered with a suitable coating which has one of, or a plurality of:

High grip properties; anti-static properties; non-slip properties; for example to prevent the mat moving relative to the floor or work surface on which it is placed. Taking the example of a non-slip coating, this may be provided on one or both of the planar layers prior to moulding of the tile.

Alternatively the non-slip coating may be applied to the tile after moulding by any appropriate means, for example by screen printing. The non-slip coating may substantially cover the layer to which it is applied or, alternatively, may be in discrete patches. The coating may be PVC based.

The layers may be relatively thin, for example a 30 µm thick layer of orientated polypropylene (OPP), as rigidity is provided by the moulded plastics tile and the tension effect of the layers applied thereto.

The planar layers protect the mat from wear and tear, such as scuffing, and protect applied printed matter thereunder. Advantageously, the mat can be manufactured to have a relatively slimline construction whilst maintaining strength and rigidity. In one embodiment the planar layers are transparent and sufficiently thin to give minimum light diffraction.

The upper planar layer of the mat, that is to say the layer which is intended to be uppermost when the mat is supported upon a surface, may be textured in the mould in which the tile is moulded, part of the mould being suitably formed to provide the desired texturing. The pressure of the plastics material in the mould against the intended upper layer of the completed mat during moulding of the tile causes the layer to be formed with the textured features of the part of the mould.

The lower planar may be textured in the mould, for example by having ridges, protrusions, or dimples, so as to improve friction between the mat and the underlying surface on which it is supported for use. As with the textured upper planar layer just described, part of the mould may be suitably formed to provide the desired texturing.

Where the mat is, for example, a mat for a computer mouse, its edges are preferably, rounded down from the upper surface to provide a comfortable periphery to the mat for the user of the mouse.

In a further embodiment, the mat may include a thicker non-slip backing material. For that purpose the lower planar layer may include, on its outer surface, heat activated adhesive means whereby the backing material is fixed to the underside of the mat. Use of such adhesive means allows the mat to be aligned correctly on the non-slip backing material before the adhesive is activated by a heating step, during the mat's manufacture, which bonds the backing material to the mat.

The lower layer may comprise a laminate, preferably of at least three laminae, for example:
A first lamina fixed at one side to the planar tile;
A second lamina of aluminium foil bonded to the opposite side of the first lamina; and
A lamina of heat sensitive adhesive fixed to the external face of the aluminium foil.

Any suitable type of backing material may be applied to be fixed to the lower layer by the heat activated adhesive means.

The mat may include decorative effects such as, but not limited to, metalisation effects, holograms, and lenticular surfaces. In one embodiment the decorative effects may be printed on the planar layer or layers, as desired. Alternatively the decorative effects may be produced during moulding of the mat via appropriate shaping or texturing of the mould, and accurate alignment of the planar layers therewith.

According to the second aspect of the invention, a method of manufacturing a laminar mat comprises inserting at least two planar layers of similar material into a mould at opposed surfaces thereof, filling the mould with a molten plastics material between the planar layers and allowing the plastics material to set to produce a planar tile with said planar layers bonded to opposite surfaces thereof.

The method preferably has a single moulding step and produces laminar mats of relatively slimline construction with each constituent layer being produced at its effective minimum available production thickness. This allows the mat to be produced economically and quickly as the mat is in a finished state upon leaving the mould. By integrating the planar layers with the tile during moulding the need for adhesive is eliminated.

The method preferably includes the use of multi-impression tooling to mould a plurality of mats in a single moulding operation.

The method may further comprise the steps of:
including on one layer of the mat, heat-activated adhesive means on a lamina of heat conductive material so that, the moulded mat includes a heat-activated adhesive means;
After removing the moulded tile from the mould, positioning backing material on said one layer of the tile using alignment means to align the tile and backing material; and passing the mat and aligned backing material under an induction head which causes the heat-conductive lamina to heat-activate the adhesive, bonding the said one layer of the mat to the backing material.

The heat conductive lamina is preferably aluminium foil.

The alignment means preferably comprises a formed edge of the mat which positively locates the backing material correctly with respect to the said one layer of the tile before the adhesive is heat activated to bond that layer to the backing material.

Pressure may be applied to the opposite layer of the tile during the heat activation of the adhesive. The moulded mat may be removed from the mould by robotic means.

The mould may include parts to allow texturing to be applied to one or both of the layers.

According to a further aspect of the present invention there is provided a mould for the production of a laminar mat, the mould comprising two mould parts defining therebetween a cavity which is filled during moulding, one of said mould parts being provided with an injection port, wherein said injection port has a peripheral wall extending partially across said cavity towards the other of said mould parts. The wall of the injection port acts to both to locate a planar layer in the mould and to guide material injected through the port. The wall may be discontinuous, for example castellated.

There now follows by way of example only a detailed description of embodiments of the invention with reference to the accompanying drawings of which:

FIG. 1b shows a close-up cross-sectional view A of the laminar mat of FIG. 11a;

FIG. 2b shows a close-up cross-sectional view B of the laminar mat of FIG. 2a;

Figure 1A:
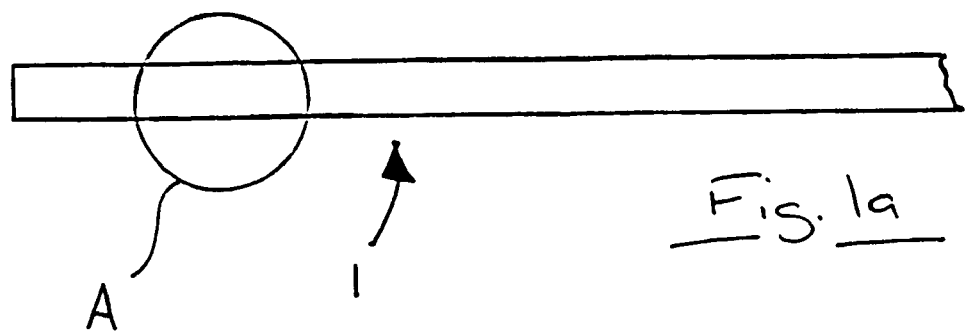
FIG. 1a shows a cross-sectional view of a laminar mat according to one embodiment of the invention.
Figure 1B:
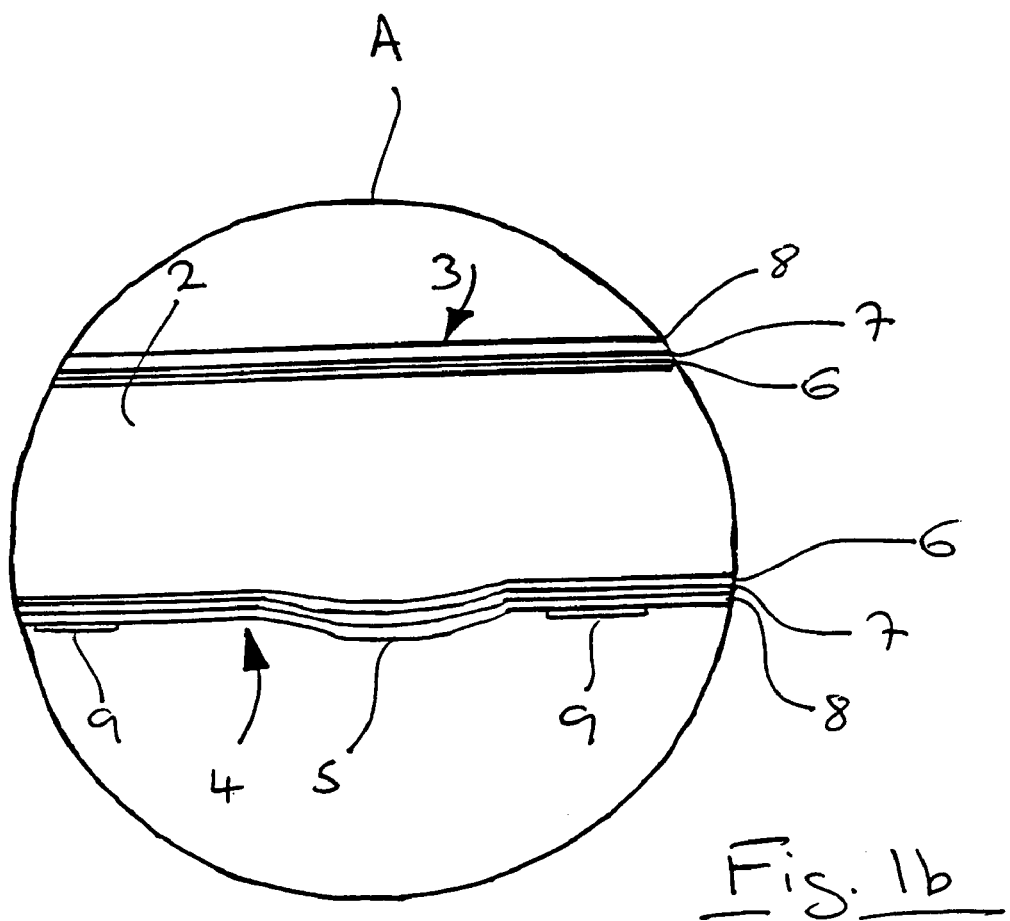
Figure 5:
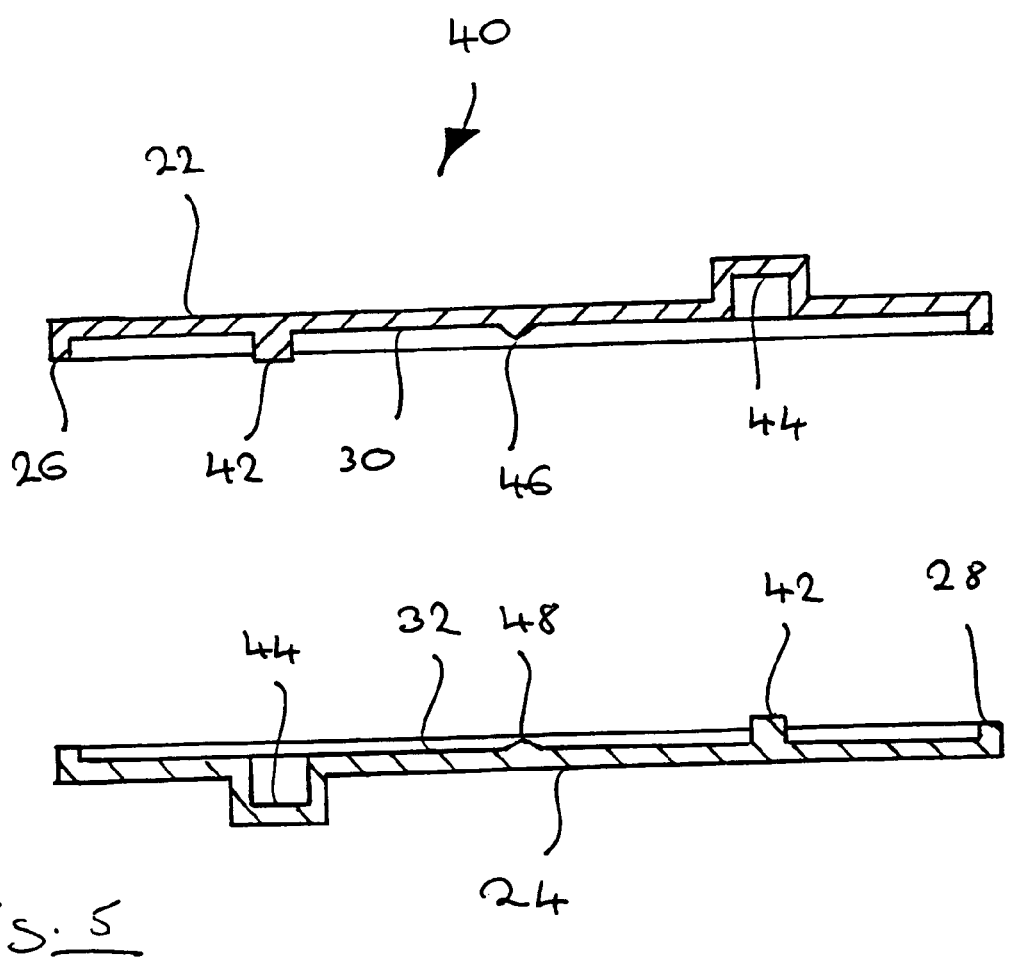
FIG. 5 shows a cross-sectional view of an alternative mould adapted to form a laminar mat according to an embodiment of the present invention.
Figure 6:
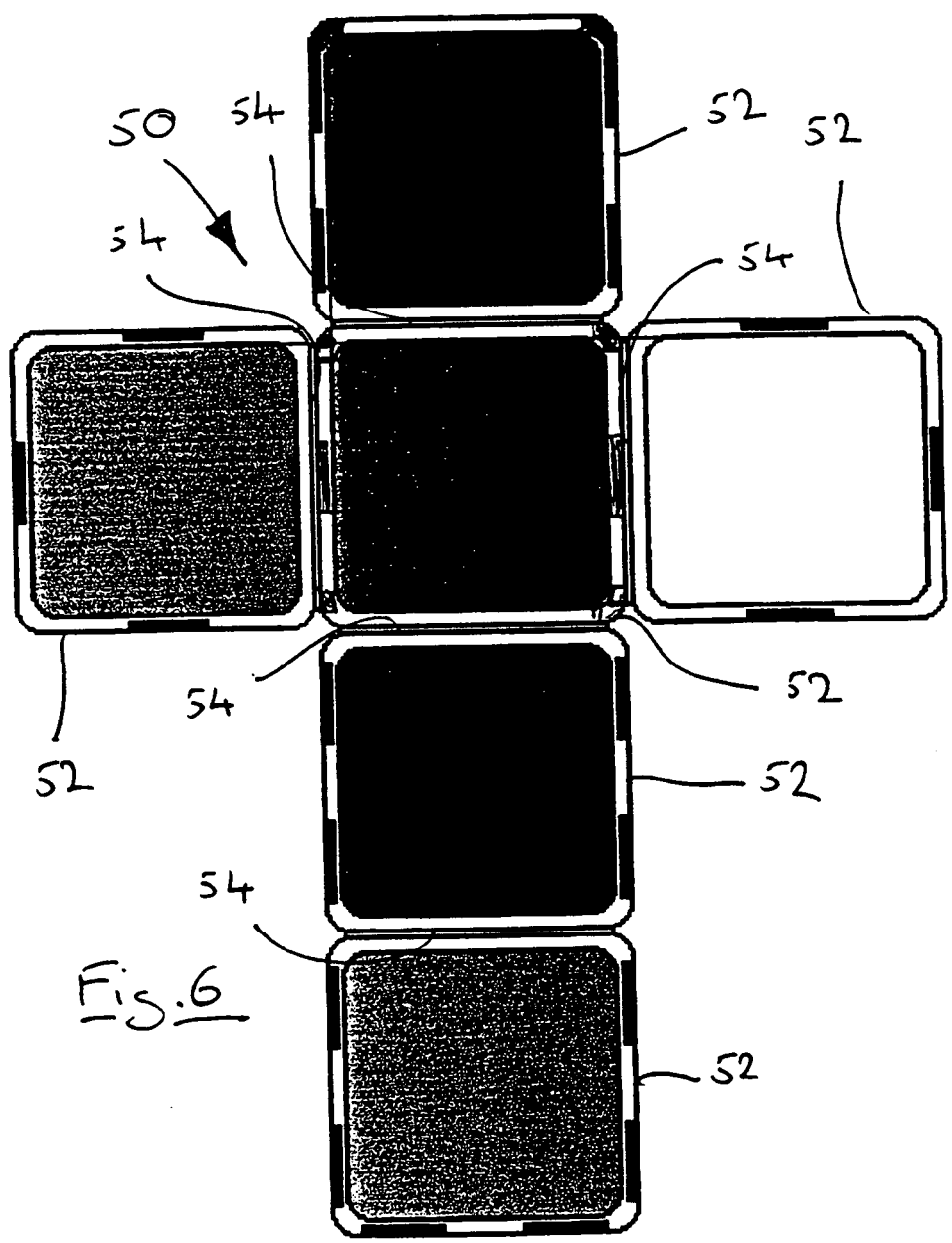

FIG. 6 shows a plan view of a mat formed using a mould having similar features to that shown in FIG. 5; and FIG. 7 shows a perspective view of a cut-out laminar mat according to an embodiment of the invention In FIGS. 1a and 1b the mat 1 comprises a moulded planar tile 2 of polypropylene. The tile 1 is, typically, approximately 1 mm thick. Before moulding of the tile, upper and lower planar layers 3, 4 are positioned in the mould against opposed surfaces thereof so that, when the mat is subsequently moulded in the mould, the layers 3, 4 are respectively fixed integrally to opposite, upper and lower, surfaces of the tile. Dimples are moulded in the lower surface of the tile which produce corresponding dimples 5 in the lower layer 4 fixed to the surface. The dimples 5 assist in improving friction between the mat and an underlying surface on which it may be supported for use.

The layers 3, 4 each comprise a laminated structure of 3 sub-layers: a lamina of oriented polypropylene (OPP) 6, typically 30 μm thick, closest to the surface of the tile, and a printed lamina 7 on the underside of a third lamina 8 of the oriented polypropylene (OPP), typically 20 μm thick. As an alternative to the OPP, a lamina of paper, for example 100 gsm, may be used, as it is easier to print on the paper than it is on the OPP lamina.

The rigidity of the mat is conferred by the plastics material of the tile 2, reinforced against bending or other distortion of the plastics material after moulding by virtue of the layers 3, 4 on its upper and lower surfaces. The layers offer a scuff-resistant cover to the surfaces of the mat and are generally transparent so that underlying print is clearly visible through the layers. In the mat shown, the tile, and thus the upper layer 3, has its edges rounded down from the upper surface to the lower surface to improve comfort for the user of the mat.

The upper layer 3 of the same construction as the lower layer 4 which doubles the available printing space on the mat. The outermost lamina of each layer can be selected to be of a suitable material to improve contact with the mouse ball or underlying surface. Alternatively, the layer may be coated with a suitable coat 9 conferring improved contact with the mouse ball or underlying surface. Such a coat may be PVC based and applied in discrete patches as shown in FIG. 1b. The provision of such a coat 9, depending upon its constitution, may typically increase the static friction coefficient (SFC) of the side to which it is applied by a factor of about 4 times.

Taking the example of a mat with an underside having a rubberised coat screen printed thereto and an uncoated OPP top surface, the following characteristics were observed. Using a first test surface of matt painted, flat MDF with few surface features and a test weight of 1 Kg applied to the mat to approximate the weight of a hand resting on the mat, an average SFC of 6.7 was observed with the coated underside in contact with the test surface compared to an average SFC of 2.08 with the mat inverted and the uncoated top surface in contact with the test surface. Using a second test surface of gloss painted, flat metal with no surface features, average SFC's of respectively 8.86 and 1.88 were observed.

Texturing (not shown) may be applied to the upper layer 3 by a suitably textured part of the mould. The texturing may improve contact with the mouse ball, incorporate advertising and/or improve the decorative appearance of the mat.

The lower layer 4 is evenly covered with dimples 5 to improve friction between the mat and the underlying surface, such as a table top, one which the mat is supported for use.

Figure 2A:
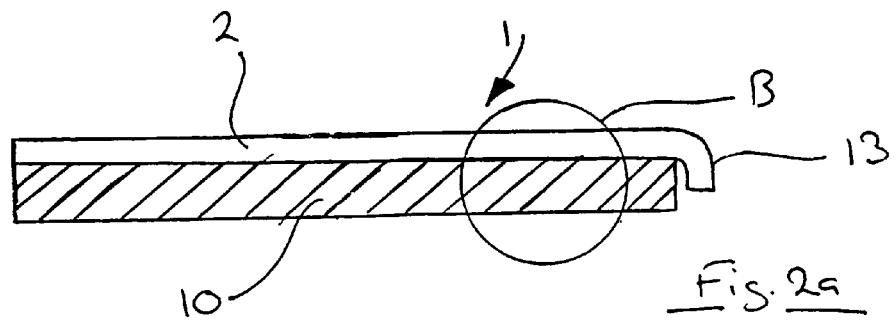
FIG. 2a shows a cross-sectional view of a laminar mat according to a further embodiment of the invention.
Figure 2B:
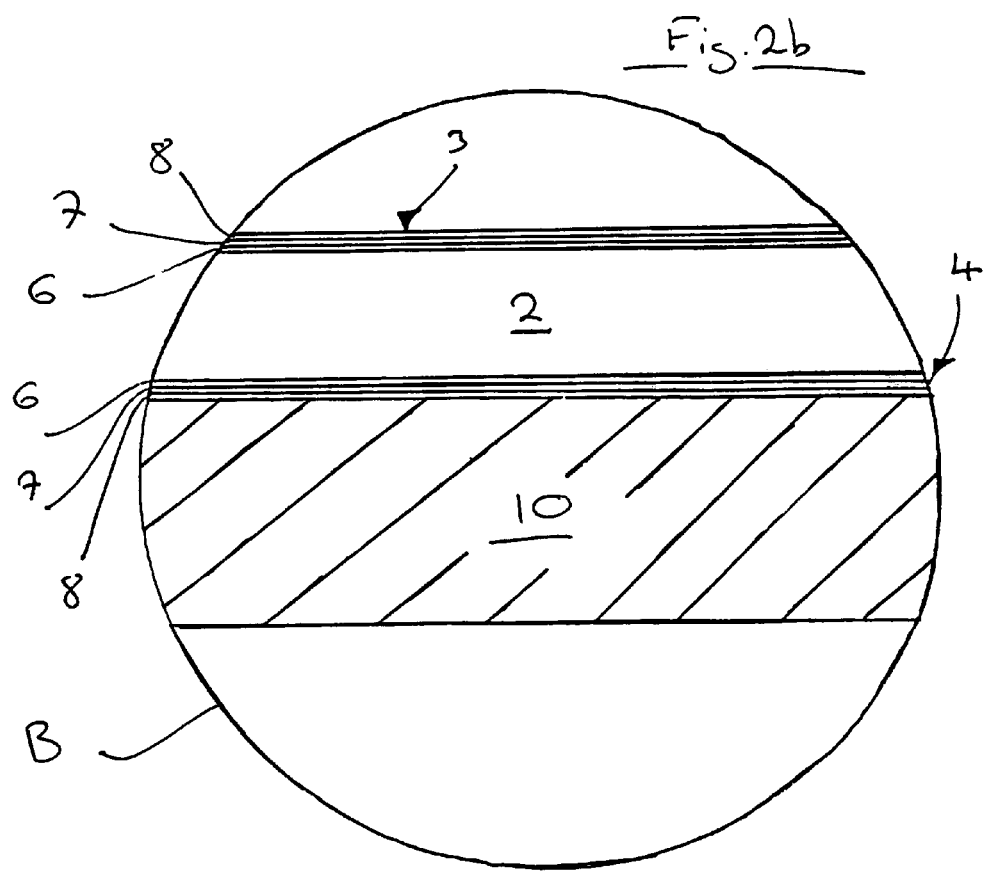

A further embodiment of the mat according to the invention is shown in FIG. 2. The mat has a foam backing 10 to improve the grip of the mat on a supporting underlying surface. The foam backing 10 is attached to the lower layer of the mat after moulding of the plastics tile. In this embodiment the mat has an arcuately down-turned peripheral edge 13 so that it is of a shallow inverted tray form. This rebated edge is more comfortable for the user as it presents a contoured smooth surface.

The lower layer 34 of the mat comprises an OPP lamina 6, typically 30 μm thick, following by an aluminium foil lamina 11, typically 7 μm thick, with a heat-activated adhesive lamina 12 attached thereto. After the may has been removed, conveniently robotically, from the mould, a layer of backing foam 10, typically 3 mm thick, is placed on the heat sensitive layer using the down-turned edge 13 of the mat to locate the foam accurately with respect to the mat within the confines of the edge. The aligned tile and backing foam 10 is passed under an induction head to heat the aluminium foil and activate the heat-activated adhesive which bonds the backing foam 10 to the mat 1.

No adhesive spreads to the surrounding, overlapping edge of the mat during fixing of the foam backing to the mat, as the laminae and backing are held in a fixed position relative to each other during heat-activation of the adhesive.

Figure 3:
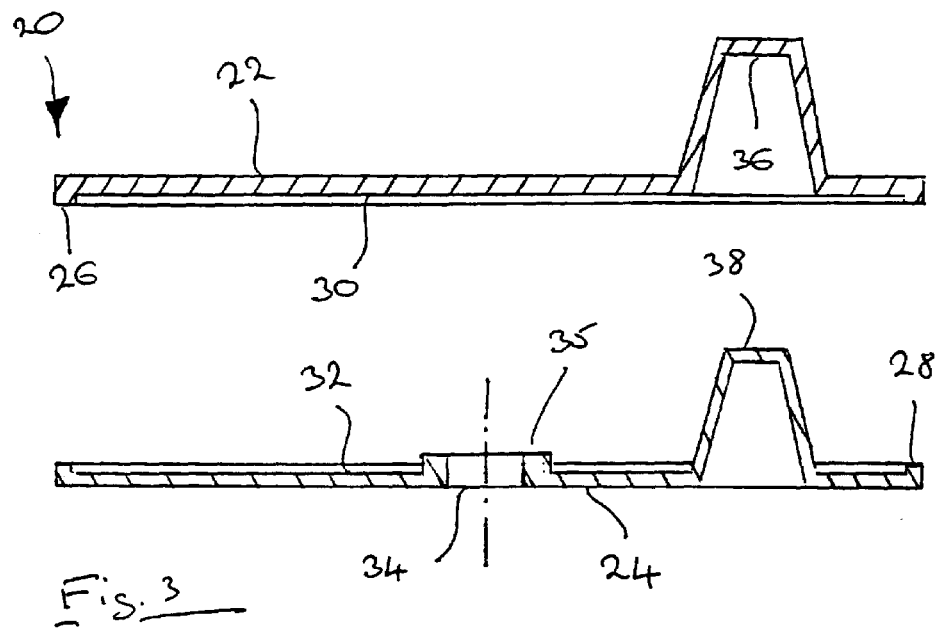
FIG. 3 shows a cross-sectional view of a mould adapted to form a laminar mat according to an embodiment of the invention.

Referring now to FIG. 3 there is shown a simplified cross-sectional view of a mould, generally designated 20, for use in manufacturing a laminar mat in accordance with the present invention. The mould 20 comprises two halves 22, 24. The following description will refer to upper 22 and lower 24 halves of the mould, however it will be understood that this identification of the mould halves is used for the sake of clarity and not to imply any restrictions as to orientation of the mould 20. Both mould halves 22,24 have a peripheral lip 26,28 defining in each half 22,24 opposing recessed portions 30,32. Both halves 22,24 are mounted so as to be movable together to close the mould 20 prior to a moulding operation and apart to open the mould 20 and subsequently release a moulded mat. The lower mould half 24 is provided with an injection port 34 to allow the injection of a plastics material. The port 34 enables plastics material to be injected in a direction substantially perpendicular to the plane of the finished mat.

The injection port 34 is surrounded by a raised wall 35 which extends from the recessed portion 32 of the lower mould. The wall 35 stands proud of the lip 28 but is sized such that, when the mould 20 is closed, there is a clearance between the top of the wall 35 and the recessed portion 30 of the upper mould half 22. The wall 35 acts to both guide the plastics material during injection between the planar layers and to locate the lower planar layer in the lower mould half 24. Location of the lower planar layer is achieved by locating the wall 35 in an aperture of the planar layer.

The mould 20 of FIG. 3 is configured so as to provide a laminar mat having a raised projection. The projection may be used to mount an accessory to the laminar mat. The accessory may be, for example, a figurine or a cable guide for a mouse cable. To achieve this, the upper mould half 22 is provided with a frusto-conical recess 36 and the lower mould half with a frusto-conical projection 38 arranged to fit the recess 36. The projection 38 and recess 36 are dimensioned such that, when the mould 20 is closed, a clearance is provided therebetween and into which plastics material injected via the injection port 34 may flow.

In use, planar layers, for example a three ply arrangement of oriented polypropylene (OPP) and paper, are inserted into the recessed portions 30,32 of each mould half 22,24. The planar layers are sized to fit closely to the respective lip 26,28 of each mould half 22,24 so as to ensure that the planar layers do not move relative to the mould halves 22,24 or each other either before or during moulding of a laminar mat. Alternatively, the planar layers may be retained in the mould 20 by other means such as, for example, in-mould fixings such as pins, an electrostatic charge, or a vacuum.

In the embodiment shown it will be understood that the planar layers include apertures which align with the frusto-conical projection and recess 36,38, and through which the projection 38 passes when the mould 20 is closed.

Once the planar layers have been inserted into the mould 20 the two mould halves 22,24 are closed and molten plastics material, for example polypropylene, is injected via the injection port 34. It will be understood that the planar layer of the lower mould half 24 is provided with an aperture which, in use, is aligned with the injection port 34. Thus the molten plastics material is injected into the centre of the mould 20 between the planar layers. As the plastics material is introduced it urges the planar layers against their respective mould halves 22,24 and reduces the possibility of the planar layers becoming distorted or folded during the moulding operation. The plastics material flows between the frusto-conical projection and recess 36,38 so as to provide a frusto-conical projection of the laminar mat having a wall thickness equal to the clearance between the projection and recess 36,38. Once injection of the plastics material has been completed the mould halves 22,24 are separated and the laminar mat removed.

Figures 4A, 4B:
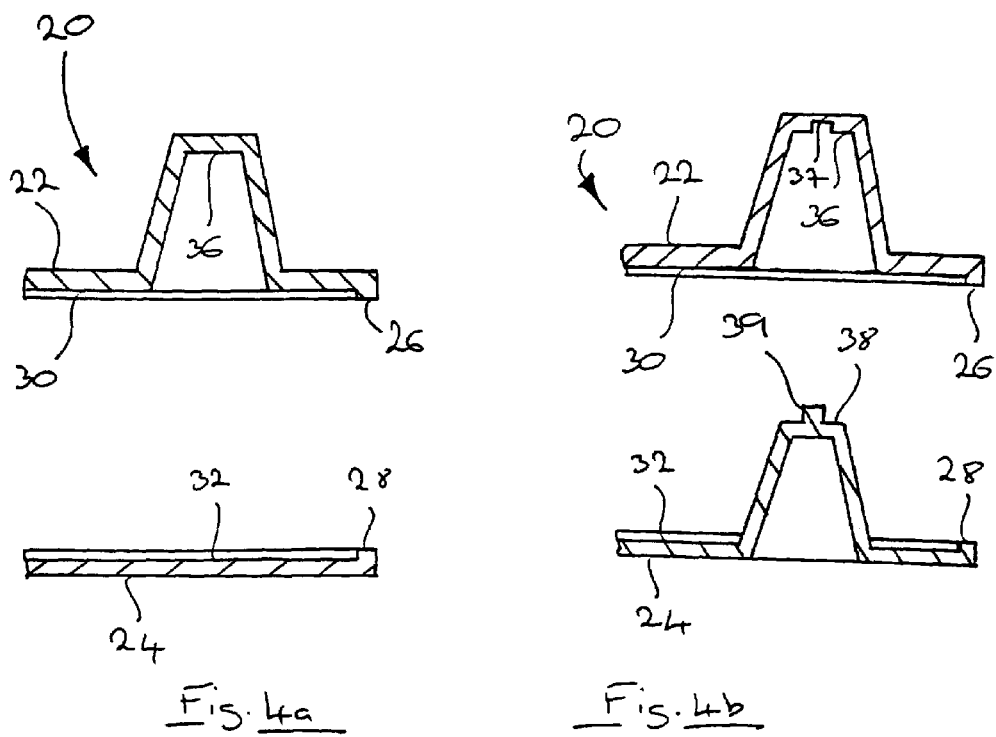
FIGS. 4a and 4b show partial cross-sectional views of alternative mould configurations.

FIGS. 4a and 4b show alternative mould configurations which may be utilised to provide a raised projection in a finished mat. Features common to the mould 20 of FIG. 3 are designated with like reference numerals. In FIG. 4a the upper mould half 22 is provided with a recess 36 while the lower mould half 24 is planar. It will be understood that a mould having this configuration will form a mat having a solid projection. In such an embodiment the upper planar layer may be provided with an aperture which is alignable with the recess 36 or, alternatively, the planar layer may be weakened in the region of the recess. Where the planar layer is weakened, for example by scoring or the provision of one or more cuts therein, the planar layer ruptures during injection of the plastics material thereby allowing the recess 36 to be filled.

FIG. 4b shows yet a further embodiment of the mould 20 wherein the upper mould half 22 is provided with a recess 36 and the lower mould half 24 with a projection 38. The projection 38 is further provided with a raised pin 39 which is receivable in a corresponding blind hole 37 of the recess 36. The pin and hole 37,39 enable a through hole to be moulded in the projection of the mat.

FIG. 5 shows an alternative mould arrangement generally designated 40. For the sake of clarity features common to the mould 20 of FIG. 3 are designated with like reference numerals. As before the mould 40 comprises upper and lower mould halves 22,24 each having a peripheral lip 26. The mould halves 22,24 are provided with aligned projections and recesses 42,44 which enable a planar laminar mat to be moulded with corresponding projections and recesses therein. Again it will be understood that the planar layers used in conjunction with the mould 40 are provided with apertures which align with the projections and recesses 42,44.

The mould halves 42,44 are further provided with opposed projections 46,48 which are sized such that, when the mould 40 is closed, a clearance is provided therebetween. These opposed projections 46,48 enable a living hinge to be moulded in a laminar mat.

FIG. 6 shows a plan view of a laminar mat 50 moulded using a mould having features as described above with reference to FIG. 4. The mat 50 is composed of six panels 52 interconnected by living hinges 54 so as to define a cruciform shape. The perimeter of each panel 52 is provided with a projection or recess which may be engaged with a complementary recess or projection of another panel 52. It will thus be understood that the panels 52 may be folded about the living hinges 54 and secured by the inter engagement of appropriate projections and recesses to form a cube.

The cruciform shape of the mat 50 of FIG. 6 may be achieved by a cutting or stamping operation as illustrated in FIG. 7. Here a lozenge shaped mat 56 is shown cut from a blank 58 having a more regular rectangular shape. By utilising a cutting operation to produce a laminar mat 56 having desired dimensions means that reduces the degree of accuracy required in aligning the planar layers in the mould halves prior to injection of the plastics material.

The invention claimed is:

1. A laminar mouse mat consisting essentially of a rigid planar tile of moulded plastics material having upon respective upper and lower surfaces respective upper and lower planar layers non-adhesively bonded therewith, wherein the upper and lower planar layers are each constructed from the identical material to prevent distortion of the tile during moulding thereof, the upper planar layer is textured by a mould during moulding of the mat, and the lower planar layer is provided with an external non-slip coating which, in use, resists the mat moving relative to the work surface upon which it is placed.

2. A laminar mouse mat as claimed in claim 1 wherein the planar layers comprise a plastics material.

3. A laminar mouse mat as claimed in claim 2 wherein said plastics material of the planar layers is polypropylene.

4. A laminar mouse mat as claimed in claim 3 wherein said plastics material of the planar layers is oriented polypropylene.

5. A laminar mouse mat as claimed in claim 1 wherein the planar layers comprise paper.

6. A laminar mouse mat as claimed in claim 1 wherein the planar layers comprise cardboard.

7. A laminar mouse mat as claimed in claim 1 wherein both of the planar layers are laminated.

8. A laminar mouse mat as claimed in claim 7 wherein the planar layers include laminae made from material selected from the following: plastics material, paper and cardboard.

9. A laminar mouse mat as claimed in claim 8 wherein the plastics material of the planar layers is selected from polypropylene, oriented polypropylene or polyester.

10. A laminar mouse mat as claimed in claim 7 wherein the planar layers each comprise three laminae.

11. A laminar mouse mat as claimed in claim 10 wherein the planar layers each comprise three laminae of oriented polypropylene.

12. A laminar mouse mat as claimed in claim 10 wherein the planar layers each comprise a lamina of paper provided between laminae of oriented polypropylene.

13. A laminar mouse mat as claimed in claim 1 wherein at least one of the planar layers includes a coating with anti-static properties.

14. A laminar mouse mat as claimed in claim 1 wherein the external non-slip coating is formed by screen printing.

* * * * *